(12) United States Patent
Zhang

(10) Patent No.: US 10,785,254 B2
(45) Date of Patent: Sep. 22, 2020

(54) NETWORK ATTACK DEFENSE METHOD, APPARATUS, AND SYSTEM

(71) Applicant: TENCENT TECHNOLOGY (SHENZHEN) COMPANY LIMITED, Shenzhen, Guangdong (CN)

(72) Inventor: Haohao Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 47 days.

(21) Appl. No.: 16/023,294

(22) Filed: Jun. 29, 2018

(65) Prior Publication Data

US 2018/0324209 A1 Nov. 8, 2018

Related U.S. Application Data

(63) Continuation of application No. PCT/CN2017/103934, filed on Sep. 28, 2017.

(30) Foreign Application Priority Data

Sep. 29, 2016 (CN) .......................... 2016 1 0870444

(51) Int. Cl.
*H04L 29/06* (2006.01)
*H04L 29/08* (2006.01)

(52) U.S. Cl.
CPC ...... *H04L 63/1441* (2013.01); *H04L 63/0892* (2013.01); *H04L 63/1408* (2013.01);
(Continued)

(58) Field of Classification Search
CPC ............ H04L 63/1441; H04L 67/2819; H04L 67/2814; H04L 63/0892; H04L 63/1458;
(Continued)

(56) References Cited

U.S. PATENT DOCUMENTS 5,798,711 A * 8/1998 Issa .......................... G07C 9/28
340/5.26
7,149,892 B2 * 12/2006 Freed .................. H04L 63/0281
713/151
(Continued)

FOREIGN PATENT DOCUMENTS

CN 101180826 A 5/2008
CN 101902456 A 12/2010
(Continued)

OTHER PUBLICATIONS

International Search Report for PCT/CN2017/103934 dated Jan. 3, 2018 [PCT/ISA/210].
(Continued)

*Primary Examiner* — Abu S Sholeman
(74) *Attorney, Agent, or Firm* — Sughrue Mion, PLLC

(57) ABSTRACT

A network attack defense method is provided. An access request transmitted from a client to a target server is intercepted by at least one processor of a bypass check device. The client is redirected to a target verification server, to perform verification of a verification code on the client. A verification result of the verification of the verification code performed on the client by the target verification server is obtained. The access request sent by the client is forwarded to the target server based on the verification result indicating that client verification is successful.

16 Claims, 8 Drawing Sheets

(52) U.S. Cl.
CPC ...... *H04L 63/1458* (2013.01); *H04L 67/2814* (2013.01); *H04L 67/2819* (2013.01); *H04L 67/42* (2013.01)

(58) Field of Classification Search
CPC . H04L 63/1408; H04L 67/42; H04L 63/0815; H04L 51/04; H04L 51/00; H04W 84/12
See application file for complete search history.

(56) References Cited

U.S. PATENT DOCUMENTS

| | | | | |
|---|---|---|---|---|
| 9,053,216 | B1* | 6/2015 | Coleman | G06F 11/3055 |
| 10,420,009 | B2* | 9/2019 | Wang | H04W 40/22 |
| 2003/0191848 | A1* | 10/2003 | Hesselink | H04L 63/0218 |
| | | | | 709/229 |
| 2006/0236383 | A1* | 10/2006 | Cam-Winset | H04L 63/0815 |
| | | | | 726/8 |
| 2007/0136809 | A1* | 6/2007 | Kim | H04L 63/1441 |
| | | | | 726/22 |
| 2010/0229223 | A1* | 9/2010 | Shepard | G06F 21/31 |
| | | | | 726/5 |
| 2013/0091578 | A1* | 4/2013 | Bisht | G06F 21/53 |
| | | | | 726/25 |
| 2017/0034164 | A1* | 2/2017 | Khalil | H04L 63/0876 |

FOREIGN PATENT DOCUMENTS

| | | |
|---|---|---|
| CN | 102185859 A | 9/2011 |
| CN | 102413105 A | 4/2012 |
| CN | 103765851 A | 4/2014 |
| CN | 105426415 A | 3/2016 |
| CN | 105656843 A | 6/2016 |
| EP | 2882133 A1 | 5/2015 |

OTHER PUBLICATIONS

Written Opinion dated Jan. 3, 2018, from International Searching Authority in International Application No. PCT/CN2017/103934.
Communication dated Mar. 20, 2020, from China National Intellectual Property Administration in Application No. 201610870444.X.

* cited by examiner

NETWORK ATTACK DEFENSE METHOD, APPARATUS, AND SYSTEM

CROSS-REFERENCE TO RELATED APPLICATIONS

This application is a continuation of International Application No. PCT/CN2017/103934, filed on Sep. 28, 2017, in the Chinese Patent Office, which claims priority from Chinese Patent Application No. 201610870444.X, filed in the Chinese Patent Office on Sep. 29, 2016 and entitled "NETWORK ATTACK DEFENSE METHOD, APPARATUS, AND SYSTEM", the disclosures of which are incorporated herein by reference in their entireties.

BACKGROUND

1. Field

Methods, Apparatuses, and systems in consistent with exemplary embodiments relate to network technologies, and in particular, to a network attack defense method, apparatus, and system.

2. Description of the Related Art

With constant progress of network technologies, more network attacks are taking place in the network field. Currently, in numerous network attacks, a distributed denial of service (DDoS) attack has become a relatively severe attack means. A relatively common DDoS attack manner may be maliciously and frequently initiating an access request for a server that needs to be attacked, to occupy excessively many service resources on the server, so that a valid user cannot obtain a service response from the server.

To defend against a DDoS, a verification code verification mechanism needs to be configured on the server in advance, so that the server can start a verification code verification function for the access request. After the server starts the verification code verification function, if the server receives an access request sent by a client, the server may return a verification code input interface to the client. If the server confirms that the client enters a correct verification code into the verification code input interface, the server may respond to the access request of the client. However, a large quantity of servers are generally deployed in a service system such as a cloud platform or a distributed server. If a plurality of or even all servers in the service system need to defend against a DDoS, the verification code verification mechanism needs to be separately deployed on a plurality of servers, consequently causing complexity of defending against the DDoS to be relatively high.

SUMMARY

One or more exemplary embodiments provide a network attack defense method, apparatus, and system, which solve a problem that a verification code verification mechanism needs to be deployed on each server in a service system, thereby reducing complexity of defending, by the service system, against a malicious attack behavior such as a DDoS.

According to an exemplary embodiment, there is provided a network attack defense method. An access request transmitted from a client to a target server is intercepted by at least one processor of a bypass check device. The client is redirected by the at least one processor of the bypass check device to a target verification server, to perform verification of a verification code on the client. A verification result of the verification of the verification code performed on the client by the target verification server is obtained by the at least one processor of the bypass check device. The access request sent by the client is forwarded to the target server by the at least one processor of the bypass check device based on the verification result indicating that client verification is successful.

According to an exemplary embodiment, there is provided a network attack defense apparatus, including at least one memory configured to store program code; and at least one processor configured to access the at least one memory and operate according to the program code. Based on the program code, an access request transmitted from a client to a target server is intercepted by at least one processor of a bypass check device. The client is redirected by the at least one processor of the bypass check device to a target verification server, to perform verification of a verification code on the client. A verification result of the verification of the verification code performed on the client by the target verification server is obtained by the at least one processor of the bypass check device. The access request sent by the client is forwarded to the target server by the at least one processor of the bypass check device based on the verification result indicating that client verification is successful.

According to an exemplary embodiment, there is provided a network attack defense system including a bypass check device; and a target verification server. An access request transmitted from a client to a target server is intercepted by the bypass check device. The client is redirected by the bypass check device to a target verification server, to perform verification of a verification code on the client. A verification result of the verification of the verification code performed on the client by the target verification server is obtained by the bypass check device. The access request sent by the client is forwarded to the target server by the bypass check device based on the verification result indicating that client verification is successful. The target verification server performs the verification of the verification code on the client, and returns the verification result to the bypass check device.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

Figure 1:
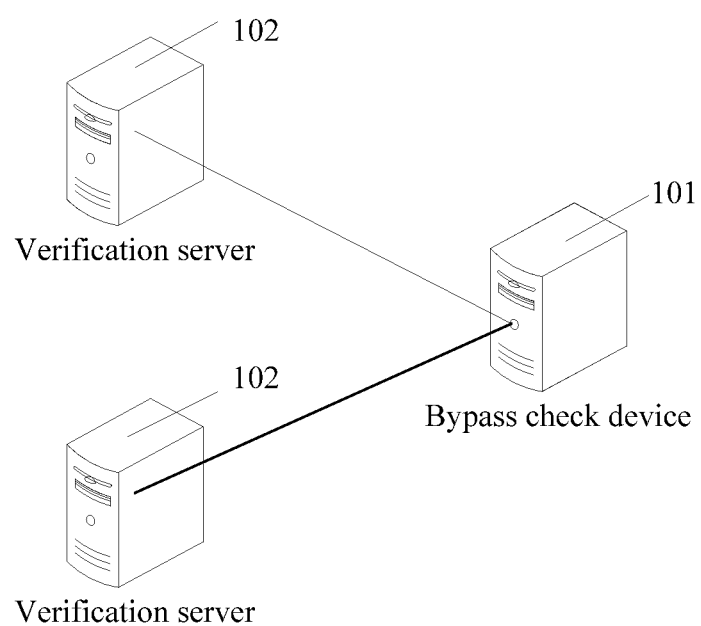
FIG. 1 is a schematic diagram of a network attack defense system according to an exemplary embodiment.

Solutions in embodiments of the disclosure may apply to any service system, to defend against a network attack for a server in a service system, thereby reducing attack behaviors of maliciously accessing the server in the service system, such as a DDoS attack. The service system may include one or more servers. For example, the service system may include a cloud platform that has a plurality of servers. In this way, in the solutions in the embodiments of the disclosure, network attack defense may be performed on one or more servers on the cloud platform. For another example, the service system may be a server cluster that provides some services, and the server cluster may include a plurality of servers. In this way, in the solutions in the embodiments of the disclosure, network attack defense may be performed on one or more servers in the server cluster.

In the embodiments of the disclosure, the described client may be a client that accesses a service system. For example, the client may be a client in which a browser is located. The client may be understood as a user terminal. The user terminal may be a smartphone, a tablet computer, an e-book reader, a moving picture experts group audio layer III (MP3) player, a moving picture experts group audio layer IV (MP4) player, a portable laptop computer, a desktop computer, or the like.

A service scenario described in the embodiments of the disclosure is for more clearly describing the technical solutions in the embodiments of the disclosure, and does not constitute a limitation on the technical solutions provided in the embodiments of the disclosure. Persons of ordinary skill may learn that, with evolution of a network architecture and appearance of a new service scenario, the technical solutions provided in the embodiments of the disclosure also apply to a similar technical problem.

In the embodiments of the disclosure, a network attack defense system may include a bypass check device and one or more verification servers. The bypass check device may be connected to a verification server by using a network.

After the network attack defense system is deployed for the service system, a target server indicates any server in the service system, and a target verification server indicates any verification server in the network attack defense system. By using the bypass check device in the network attack defense system, an access request sent to the target server may be intercepted, and a client that sends the access request may be redirected to the target verification server, to perform verification code verification (or verification of a verification code) on the client by using the target verification server. When the bypass check device determines, according to a verification result obtained from the target verification server, that the client verification succeeds, the bypass check device may forward, to the target server, the access request sent by the client. It can be seen that, before the access request sent by the client arrives at a server in the service system, the bypass check device in the network attack defense system redirects, to the target verification server in the network attack defense system, the client that sends the access request, to perform verification code verification. The bypass check device forwards, to the target server, the access request sent by the client, only after the verification performed by the target verification server on the client succeeds. Therefore, access requests maliciously and frequently initiated to the target server by a false source or another simulated manpower by using the client may be reduced, thereby reducing behaviors that maliciously attack the service system, such as a DDoS attack.

It can be seen that, by deploying the network attack defense system for the service system, defense against a network attack such as a DDoS attack on a server in the service system may be implemented, so that defense against the DDoS attack may be implemented for the service system without a need to separately configure a verification code verification mechanism for each server in the service system, thereby helping reduce complexity of defending against the DDoS attack. In addition, logic of verification code verification for one or more servers in the service system may be set or modified in the bypass check device, and the logic does not need to be modified on a server in the service system. For example, whether verification code verification is started for a server or some pages of a server is set, to perform verification code verification on a client that accesses the server or the some pages of the server. For another example, using a verification code verification manner such as a character or a picture is set, so that the logic of the verification code verification may be flexibly modified or set without a need to interrupt a service of the server in the service system, thereby improving flexibility of defending, by the service system, against an attack such as a DDoS.

The following clearly and completely describes the technical solutions in the embodiments of this application with reference to the accompanying drawings in the embodiments of this application. Apparently, the described embodiments are some embodiments of this application rather than all of the embodiments. All other embodiments obtained by persons of ordinary skill in the art based on the embodiments of this application without creative efforts shall fall within the protection scope of this application.

FIG. 1 is a schematic diagram of a network attack defense system according to an exemplary embodiment.

It can be learned from FIG. 1 that, the network attack defense system may include: a bypass check device 101 and at least one verification server 102 connected to the bypass check device by using a network. Any verification server 102 may be represented as a target verification server.

One or more types of verification codes may be preset in the verification server 102. For a verification mechanism corresponding to the verification code, refer to a completely automated public Turing test to tell computers and humans apart (CAPTCHA), that is, the verification mechanism may be implemented as a completely automated public program used for distinguishing whether a user is a computer or a human being.

It may be understood that, by presetting different verification code verification rules in the verification server 102, a behavior of a hacker to violently crack a password of a registered user of the server by using a particular program and continuously log on to the server may be effectively prevented. Therefore, in the embodiments, there may be a plurality of verification code verification rules.

In an implementation, a verification code that is set in the verification server 102 may be a picture verification code, that is, whether a picture selected by a client is a picture that is preset in the verification server 102 may be verified. For example, the verification server 102 may return a plurality of pictures for a client that needs to be verified, and instruct the client to enter a picture of a specified type or a picture that includes specified content. If a picture selected by the client is the picture of a specified type or the picture that includes specified content, where the picture is indicated by the verification server 102, client verification for the verification server 102 succeeds, and a user of the client may be considered as a valid user.

In another implementation, a verification code that is set in the verification server 102 may be a character string verification code. In this case, the verification server 102 may send, to a client that needs to be verified, a verification page that prompts a to-be-entered character string. If a character string entered by the client is consistent with the character string that the verification server 102 prompts the client to enter, the verification server 102 may determine that the client verification is successful.

In another implementation, a verification code that is set in the verification server 102 may be a problem-type verification code. In this case, the verification server 102 may send, to a client that needs to be verified, a verification page that includes a to-be-entered problem. A user of the client may enter, according to the problem raised on the verification page, in a manner such as typewriting or a voice, an answer corresponding to the problem. If the problem answer entered by the client matches the problem raised by the verification server 102, the verification server 102 may determine that the client verification succeeds.

Certainly, in addition to the foregoing verification code verification rules, there may be another possible implementation. Details are not described herein.

When the network attack defense system includes a plurality of verification servers 102, verification code verification rules that are preset on different verification servers 102 may be the same or may be different. For example, the plurality of verification servers 102 in the network attack defense system may be divided into a plurality of groups. Each group may include one or more verification servers 102. Verification code verification rules of verification servers 102 in a same group may be the same, and verification rules of optional verification servers 102 in different groups may be different.

It may be understood that, the network attack defense system may be deployed on a network between the service system and the client. After the network attack defense system is deployed in the service system, defense may be performed, by using the network attack defense system, against an attack behavior that performs malicious frequent access and that is initiated by the service system, such as a DDoS attack, so that defense against the DDoS attack may be implemented for the service system without a need to separately configure a verification code verification mechanism for each server in the service system, thereby helping reduce complexity of defending against the DDoS attack. In addition, logic of verification code verification for one or more servers in the service system may be set or modified in the bypass check device, and the logic does not need to be modified on a server in the service system. For example, whether verification code verification is started for a server or some pages of a server is set, to perform verification code verification on a client that accesses the server or the some pages of the server. For another example, using a verification code verification manner such as a character or a picture is set, so that the logic of the verification code verification may be flexibly modified or set without a need to interrupt a service of the server in the service system, thereby improving flexibility of defending, by the service system, against an attack such as a DDoS. The foregoing describes the network attack defense system. The following describes, with reference to FIG. 2, an application scenario in which the network attack defense system is applied to the service system.

Figure 2:
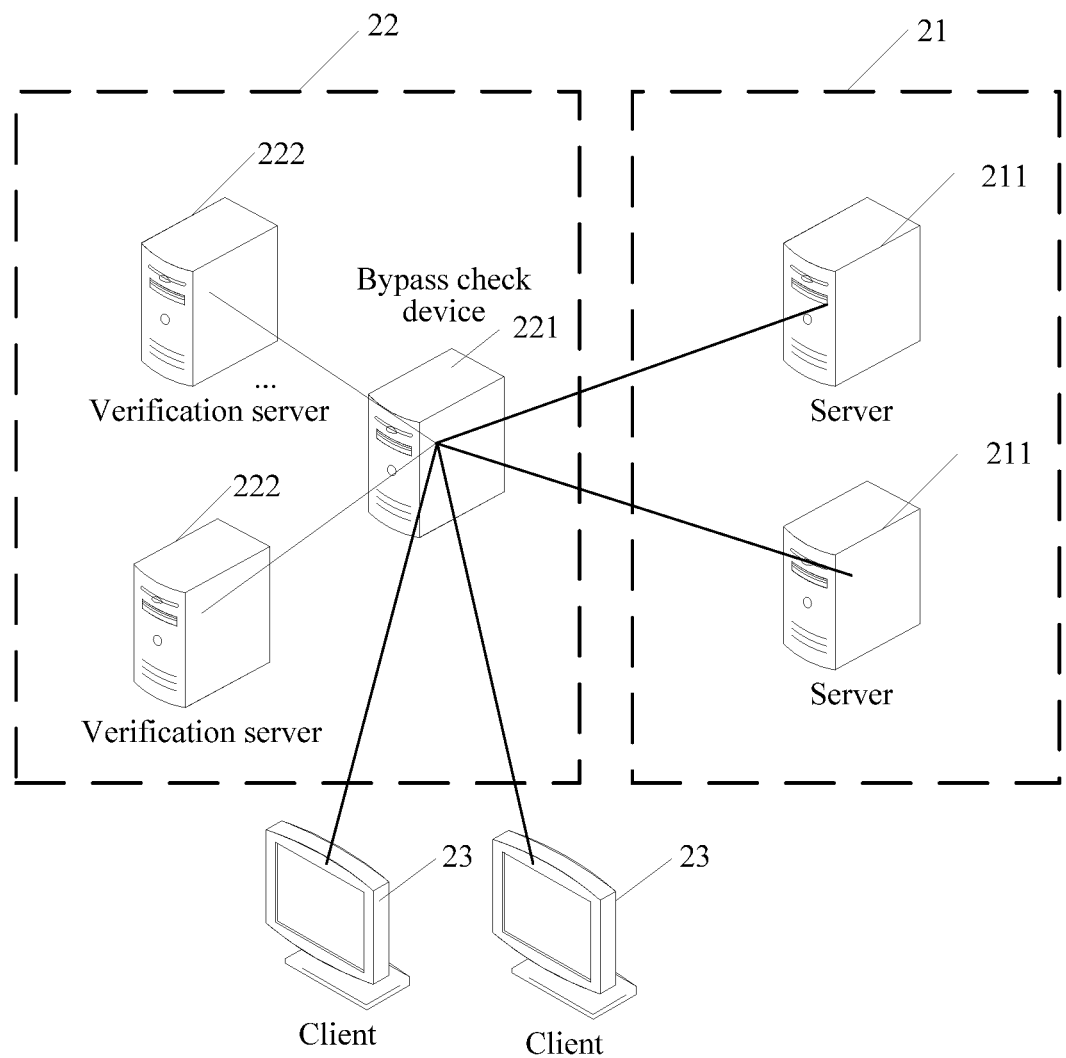
FIG. 2 is a schematic diagram of an application scenario of a network attack defense system according to an exemplary embodiment.

FIG. 2 is a schematic diagram of an application scenario of a network attack defense system according to an exemplary embodiment. It can be seen from FIG. 2 that an exemplary application scenario includes a service system 21, a network attack defense system 22, and a client 23.

The service system 21 may include at least one server 211, and any server 211 may be represented as a target server. FIG. 2 shows only a case in which the service system includes only two servers 211.

The service system 21 is connected to the network attack defense system 22. The network attack defense system 22 includes a bypass check device 221 and at least one verification server 222. Any verification server 222 may be represented as a target verification server. The bypass check device 221 is connected to the service system 21 by using a network.

The application scenario may further include one or more clients 23. For example, the client 23 may be a browser client.

In this application scenario, the target server indicates one server 211, the target verification server indicates any verification server 222. After the client 23 sends an access request to the target server, the bypass check device 221 may intercept the access request, and redirect, to the target verification server, a client that sends the access request, to perform verification code verification on the client by using the target verification server, and send a verification result to the bypass check device. When the bypass check device confirms, according to the verification result, that the client verification succeeds, the bypass check device may forward, to the target server, the access request sent by the client.

Figure 3:
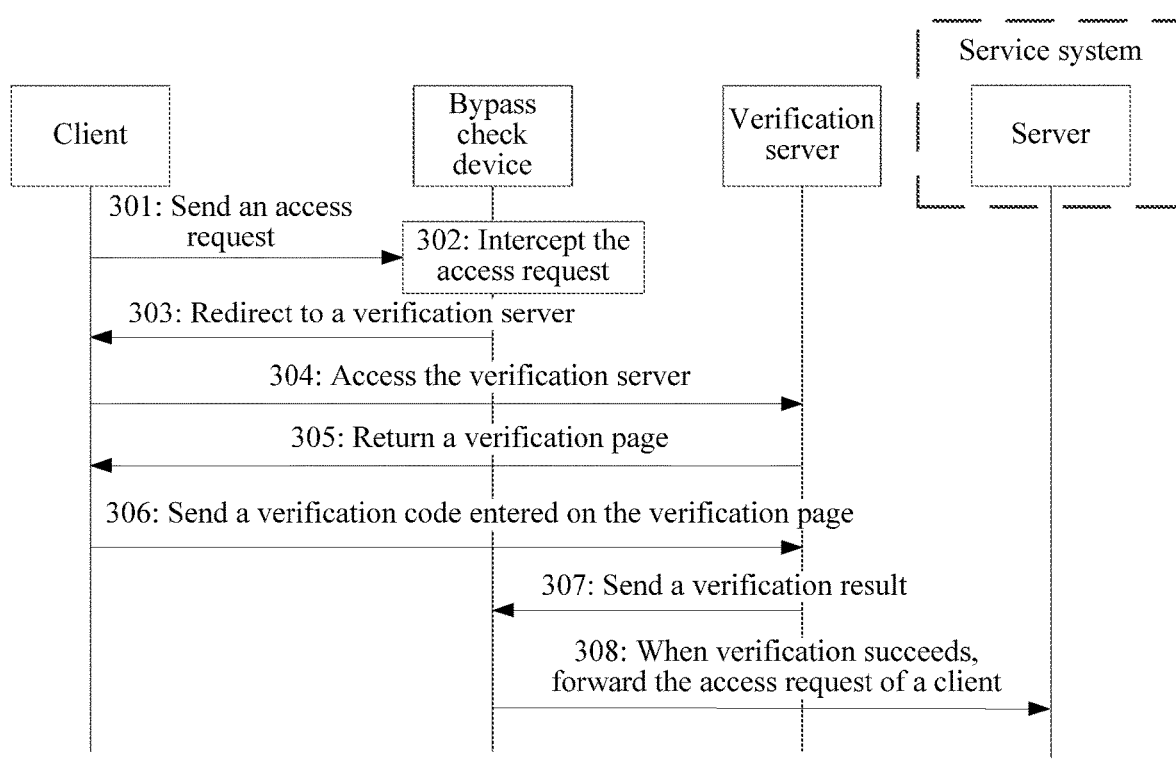
FIG. 3 is a schematic diagram of signaling interaction of a network attack defense method according to an exemplary embodiment.

The network attack defense method in the embodiments is described with reference to FIG. 1 and FIG. 2. FIG. 3 is a schematic diagram of signaling interaction of a network attack defense method according to an exemplary embodiment. The method in this embodiment may include the following operation:

301: A client sends an access request to a target server.

The access request may be used for requesting to access the target server. For example, the access request may be used for requesting to access a page of the target server.

The service system may include at least one server, and any server may be used as the target server.

The access request may carry information such as a source Internet Protocol (IP) address and a domain name. The source IP address may represent an IP address of the client that sends the access request. The domain name may include one or more pieces of information such as a host name of the target server that the access request requests to access and a page address of a target page on the target server that the access request requests to access.

The method in this embodiment may further include the following operation:

302: A bypass check device intercepts the access request sent to the target server.

In this embodiment, an access request sent by any client to the target server may first passes through the bypass check device. The bypass check device forwards, to the target server, the access request sent by the client, only after the bypass check device determines that the client is a reliable client.

There may be a plurality of manners in which the bypass check device intercepts an access request initiated to the service system. For example, an access request sent by a client to any server in the service system first arrives at a router corresponding to the service system, and then the bypass check device may intercept an access request received in the router, or the router directly forwards the access request to the bypass check device. Certainly, there may alternatively be another manner in which the bypass check device intercepts the access request initiated to the service system. This is not limited herein.

In this embodiment, logic of verification code verification for one or more servers in the service system may be set or modified in the bypass check device, and the logic does not need to be modified on a server in the service system. For example, whether verification code verification is started for a server or some pages of a server is set, to perform verification code verification on a client that accesses the server or the some pages of the server. For another example, using a verification code verification manner such as a character or a picture is set, so that the logic of the verification code verification may be flexibly modified or set without a need to interrupt a service of the server in the service system, thereby improving flexibility of defending, by the service system, against an attack such as a DDoS.

The method in this embodiment may further include the following operation:

303: The bypass check device redirects, to a target verification server, the client that sends the access request.

To defend against a DDoS attack, to reduce access requests that are maliciously and frequently initiated to a target server in the service system, and reduce service resources excessively occupied on the target server, so that a valid user can obtain a service response of the target server, the bypass check device may redirect the client to a target verification server in a network attack defense system, so that the target verification server may verify the client in a verification code verification manner.

There are a plurality of manners in which the bypass check device redirects the client to the target verification server. A possible implementation may be that, the bypass check device sends a redirection indication to the client. The redirection indication may carry an address of the target verification server. After receiving the redirection indication, the client may send a request to the target verification server based on the address of the target verification server carried in the redirection indication, to access the target verification server. Certainly, another manner in which the client can be redirected to the target verification server also applies to this embodiment. Details are not described herein again.

It may be understood that, when the network attack defense system includes only one optional verification server, the optional verification server is the target verification server, and the bypass check device may directly redirect the client to the target verification server.

When the network attack defense system includes a plurality of optional verification servers, the bypass check device may select an optional verification server from a plurality of optional verification servers as the target verification server, so as to redirect the client to the target verification server, so that the target verification server is used for verifying the client. Optionally, before redirecting the client, the bypass check device may further determine, from a plurality of optional verification servers, a target verification server that is to verify the client; and then redirect the client to the determined target verification server. The target verification server that is to verify the client is a verification server that is used for verifying the client and that is currently selected by the bypass check device.

It should be noted that, there may be a plurality of manners in which the bypass check device selects the target verification server that is to verify the client:

In a possible implementation, the bypass check device may determine, based on current load of the plurality of optional verification servers, from the plurality of optional verification servers, the target verification server that is to verify the client. For example, the bypass check device may determine, as the target verification server that is to verify the client, an optional verification server whose load is the minimum or whose load is within a preset range.

In another possible implementation, an association relationship between different servers and different verification servers in the service system may be preset in the bypass check device. For example, the different servers in the service system may have different requirements for a verification code verification manner, and verification code verification manners built in the different verification servers may be different. In this way, an association relationship between a server and a verification server in the service system may be established based on a requirement of the server, so that different servers may respond to different verification code verification manners. In this way, the bypass check device may determine a target server that the intercepted access request requests to access, and determine, based on the association relationship, a target verification server associated with the target server, to redirect the client to the target verification server.

Certainly, in addition to the foregoing two implementations for selecting the target verification server, there may also be another implementation. This is not limited herein.

The method in this embodiment may further include the following operations:

304: The client accesses the target verification server.

305: The target verification server returns a verification page to the client.

For example, the client may send an access request to the target verification server based on an address of a target verification server sent by the bypass check device, to request to access the target verification server. After receiving the request of the client, the target verification server may return a verification page to the client, to present the verification page on the client.

The verification page may include prompt information that prompts a user to enter a verification code on the client. For example, the prompt information on the verification page may include a verification code generated by the verification server and a verification code input box, or may include a plurality of optional verification codes or verification pictures, or prompt words may be further displayed on the verification page. In this embodiment, a verification code verification process may be different based on different prompt information on the verification page.

The method in this embodiment may further include the following operation:

306: The client obtains a verification code entered on the verification page, and sends the verification code to the target verification server.

When a verification code verification rule preset in the target verification server is different, the verification page may be different. Correspondingly, a verification code entered on the verification page by a user and a verification code entering manner may be different. For details, refer to the foregoing related description about the verification code verification rule.

The method in this embodiment may further include the following operation:

307: The target verification server verifies whether the verification code sent by the client is a correct verification code, and sends a verification result to the bypass check device.

The verification result may be used for reflecting whether verification of the client succeeds, and the verification result may be a verification success or a verification failure. Generally, when the verification code verification rule preset in the target verification server is different, the verification page and the prompt information on the verification page may be different. Correspondingly, the verification code verification process that generates the verification result may be different.

For example, if the prompt information on the verification page includes a verification code generated by the target verification server and the verification code input box, the verification code input box is used by a user to enter a verification code. After the verification page is displayed on the client, if the access request sent by the client is not an access request initiated by simulated manpower, a user of the client may enter, in the verification code input box, based on a verification code displayed on the verification page, a verification code that is same as the verification code displayed on the verification page. The target verification server verifies that the verification code entered by the client is the same as the verification code generated by the target verification server for the client, the verification result is a verification success; otherwise, the verification result is a verification failure, and the access request sent by the client may be an access request initiated by a false source or other simulated manpower.

For another example, if the prompt information on the verification page includes a plurality of optional verification codes or verification pictures, and prompt words are displayed on the verification page, the prompt words are used for prompting a user to select a target verification code or a target verification picture from the plurality of verification codes or verification pictures. In this way, after the verification page is displayed on the client, if the access request initiated by the client is an access request by a valid user by using the client, a user of the client selects the target verification code or the target verification picture from the verification page based on the prompt words. Correspondingly, the client sends information about the target verification code or the target verification picture selected by the user to the target verification server. If the target verification server verifies that the verification code or the verification picture sent by the client is the target verification code or the target verification picture, the verification result is a verification success; otherwise, the verification result is a verification failure.

It may be understood that, when the verification code that is entered by the client and that is described in the foregoing is inconsistent with the verification code that the target verification server prompts the client to enter, the verification result may be a verification failure. In addition, when the client does not return the verification code after preset duration, the verification result may alternatively be a verification failure.

It should be noted that, operation 304 to operation 307 are an implementation in which after the bypass check device redirects the client to the target verification server, the client and the target verification server perform verification code interaction and verification. Another manner in which the target verification server may perform verification code verification on the client also applies to this embodiment.

The method in this embodiment may further include the following operation:

308: When determining that the verification result indicates that the client verification succeeds, the bypass check device forwards, to the target server, the access request sent by the client.

The verification result sent by the verification server to the bypass check device may include identification information used for representing whether the client verification succeeds, so that the bypass check device determines, based on the verification result, whether the verification performed on the client by the verification server succeeds.

For an intercepted access request sent by the client to a server in the service system, after determining, based on the verification result, that the client verification succeeds, the bypass check device may forwards, to the target server, the access request sent by the client to the target server.

A possible implementation of operation 308 may be that, after the verification performed on the client by the target verification server succeeds, the target verification server may redirect the client to the bypass check device, and the bypass check device may forward, to the target server, an access request that is sent by the client to the service system the last time before a current moment.

Another possible implementation of operation 308 may be that, after the verification performed on the client by the target verification server succeeds, the target verification server determines an address of a target server that the client requests to access, and redirects the client to the target server based on the address of the target server. In this way, when the bypass check device determines, based on the obtained verification result, that the verification performed on the client by the target verification server succeeds, the bypass check device may forward, to the target server, the access request currently sent by the client.

In this embodiment, the verification result may be for the purpose of forwarding the access request to the target server when the bypass check device determines that the client verification succeeds, to implement access to the target server by a valid user. Therefore, an implementation may be that, the target verification server returns a verification result to the bypass check device only after the client verification succeeds, and the verification result is used for indicating that the client verification succeeds.

To distinguish a client whose verification succeeds, the verification result may include an identifier information of the client. For example, the verification result may include a source IP address corresponding to the client, to distinguish the client whose verification succeeds.

In a possible implementation of this embodiment, after the bypass check device determines that the verification performed on the client by the target verification server succeeds, the bypass check device may store identifier information of the client whose verification succeeds to a verification success list, so that subsequently the access request sent by the client to the service system may be directly forwarded to the target server, without a need to verify the client again. A verification success may be a success of verification performed by any verification server, or may be a success of verification performed by the target verification server. The identifier information of the client stored in the verification success list may be a source IP address of the client. Certainly, after the bypass check device determines that the verification performed on the client by the target verification server succeeds, and stores the identifier information of the client to the verification success list, the bypass check device may further set effective duration for storing the identifier information of the client in the verification success list, and delete the identifier information of the client from the verification success list once the effective duration expires, to perform verification code verification on the client again.

It may be understood that, in this embodiment, when a network attack defense system is deployed in the service system, the bypass check device may defend against network attack behaviors for all servers in the service system. In this way, the bypass check device redirects a client of an access request initiated by any server in the service system, to perform verification code verification on the client.

In actual application, network attack defense may alternatively be performed on all or some servers in the service system in a targeted manner; or network attack defense may be performed for access requests initiated by some source IP addresses. In this case, verification logic may be configured in the bypass check device of the network attack defense system, to configure a condition that needs to be met by an access request for which verification needs to be performed. Correspondingly, after intercepting an access request, the bypass check device may determine, based on information carried in the access request, whether verification code verification needs to be performed on a client that sends the access request. When determining that the verification code verification needs to be performed on the client, the bypass check device performs an operation of redirecting, to the target verification server, the client that sends the access request.

For example, a defense list may be maintained in the bypass check device, and the defense list may include information about a server that needs to start defense, or information about a client that needs to be defended. If information carried in an access request is information included in the defense list, a client of the access request is redirected to the verification server.

The defense list configured in the bypass check device may be set from different dimensions. For example, there may be the following cases in which the defense list is configured:

In a possible case, the bypass check device may defend against a network attack behavior for all servers in the service system. For this purpose, the bypass check device may add information about all servers in the service system to the defense list maintained in the bypass check device. Information about a server added to the defense list may include one or more pieces of information such as an address of the server, a host name of the server, and a to-be-defended page address on the server.

In another possible case, the bypass check device may be configured to defend against network attack behaviors for some servers in the service system. For this purpose, information about some servers for which network attack defense needs to be performed may be configured in the bypass check device, for example, host names and addresses of the some servers. A configuration manner is that, the bypass check device may add information about a server for which network attack defense needs to be performed to the defense list. In this case, if a target server that an access request intercepted by the bypass check device requests to access is a server that is in the defense list and that needs to be defended, the client that initiates the access request may be redirected to the target verification server, to perform verification code verification on the client.

Information about a server in the defense list may be configured in advance, or may be configured by the bypass check device when the server in the service system instructs, in real time and based on a running status of the server, the bypass check device to configure the information. For example, if a server in the service system detects that a quantity of access requests received by the server within specified duration before a current moment suddenly increase (for example, the quantity of access requests exceeds a preset threshold), the server may send indication information to the bypass check device, to instruct the bypass check device to perform network attack defense for the server, and then the bypass check device may add information about the server to the defense list. Certainly, the indication information may carry one or more pieces of information such as an address of the server, a host name, and a page address that needs to be defended.

In another possible case, information about a client on which network attack defense needs to be performed may be set, for example, a source IP address of the client and information about a user agent (UA). For example, the bypass check device adds a source IP address of a suspicious client to the defense list based on a history access record, manually entered information, or the like. If the source IP address carried in the access request is a source IP address included in the defense list, a client corresponding to the access request may be redirected to the target verification server.

In actual application, a plurality of types of information in the foregoing several possible cases may be recorded in the defense list at the same time. For example, a source IP address of a client on which network attack defense needs to be performed and a host name of the target server may be set in the defense list. In this way, a client that sends the access request needs to be redirected to the target verification server only when both the source IP address of the client and the host name of the target server that are carried in the access request are information recorded in the defense list.

Certainly, there may be other cases for a manner of configuring the defense list in the bypass check device, and information included in the defense list. This is not limited herein.

Figure 4:
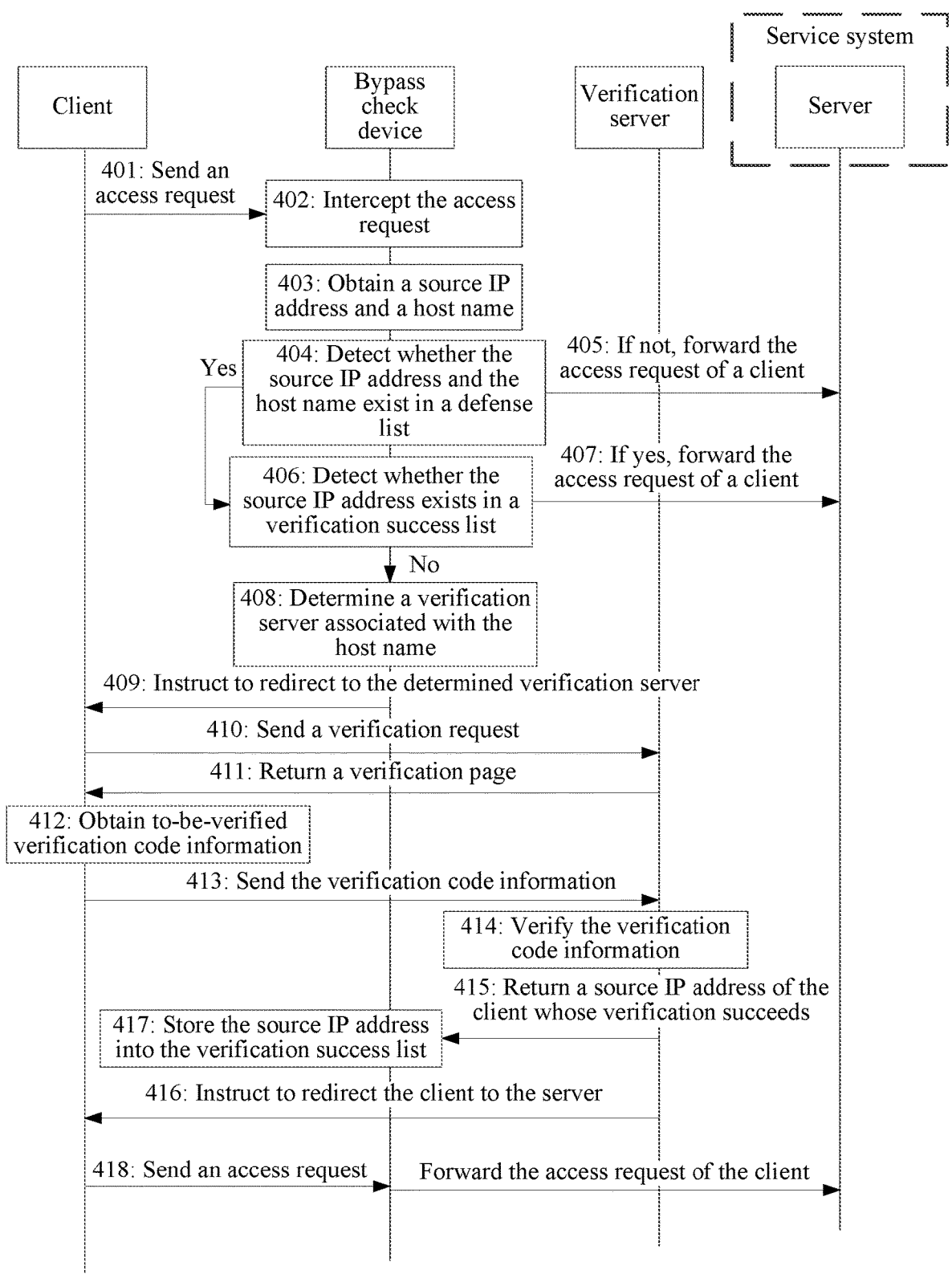
FIG. 4 is another schematic diagram of signaling interaction of a network attack defense method according to an exemplary embodiment.

For the convenience of understanding, descriptions are provided by using an example in which a defense list includes a source IP address of a client that needs to be defended and a host name of a target server. FIG. 4 is another schematic diagram of signaling interaction of a network attack defense method according to an exemplary embodiment. The method in this embodiment may include the following operations:

401: The client sends an access request to the target server, where the access request carries a source IP address and a domain name.

The domain name may be used for representing a target server that the client needs to access and a specific page. An address and a host name of the target server that the client needs to access, a page address of a page that the client needs to access, and the like may be extracted based on the domain name.

402: A bypass check device intercepts the access request.

For a specific implementation in which the bypass check device intercepts the access request, refer to the related description in the foregoing embodiment. Details are not described herein again.

403: The bypass check device obtains a source IP address and a domain name that are carried in the access request, and extracts a host name of the target server from the domain name.

404: The bypass check device detects whether the source IP address and the host name of the target server are recorded in a defense list.

If the source IP address and the host name of the target server that are carried in the access request are not information recorded in the defense list, defense does not need to be performed for the access request, and the access request may be directly forwarded to the target server that the access request requests to access.

If the source IP address and the host name of the target server that are carried in the access request are information recorded in the defense list, a client that initiates the access request needs to be defended, thereby performing operation 406, to determine whether verification code verification performed on the client succeeds.

In actual application, a correspondence between the source IP address and the host name of the target server may be further recorded in the defense list. In this way, after an access request is intercepted and the source IP address and the host name of the target server are determined from information carried in the access request, if the source IP address and the host name of the target server is a source IP address and a host name that have a correspondence between each other and that are recorded in defense list, the client needs to be redirected, so that the target verification server verifies the client. If the host name of the target server extracted from the access request is not a host name that is corresponding to the source IP address and that is in the defense list, the client may not be redirected.

405: If the source IP address and the host name of the target server are not recorded in the defense list, the bypass check device forwards the access request to the target server that the access request requests to access.

The target server that the access request requests to access is a server to which the host name extracted from the domain name carried in the access request points.

406: If the source IP address and the host name of the target server are recorded in the defense list, the bypass check device detects whether the source IP address is recorded in a stored verification success list.

A source IP address corresponding to a client whose verification succeeds before a current moment is recorded in the verification success list. If the verification success list stores a source IP address, it indicates that verification code verification performed on a client corresponding to the source IP address by the target verification server succeeds. If the verification success list does not store a source IP address, it indicates that verification code verification performed on a client corresponding to the source IP address by the target verification server fails.

It should be noted that, in this embodiment, for the convenience of description, descriptions are provided by using an example in which the bypass check device records a source IP address corresponding to a client whose verification performed by the target verification server succeeds into a verification code success table. In actual application, the source IP address of the client whose verification succeeds may alternatively be recorded into a specified storage area in the bypass check device, without a need to maintain, in a form of a table, the source IP address of the client whose verification succeeds.

407: If the source IP address is recorded in the verification success list, the bypass check device forwards the access request to the target server.

If the source IP address carried in the access request is recorded in the verification success list, it indicates that verification code verification performed on the client by the target verification server succeeds, thereby considering that the client is a reliable client, and then the access request sent by the client may be directly forwarded to the target server that the access request requests to access.

Operation 406 and operation 407 are optional operations, so that subsequently an access request that carries the source IP address in the verification success list may be directly forwarded to the target server, to prevent repeated verification.

408: If the source IP address is not recorded in the verification success list, the bypass check device determines, from a plurality of optional verification servers, a target verification server that has an association relationship with the target server.

Verification code verification may be performed on the client by using the target verification server.

In this embodiment, the network defense system may have a plurality of verification servers. In this case, the plurality of verification servers may all be used as optional verification servers and be selected to verify a client, and a selected optional verification server may be used as the target verification server. For example, a selection manner may be that, a target verification server corresponding to a host name of a target server included in a domain name in the access request may be determined, from a plurality of optional verification servers, based on an association relationship that is between a target server and a target verification server and that is preset in the bypass check device. It may be understood that, a method of selecting, based on load of the plurality of optional verification servers, a target verification server that needs to verify a client also applies to this embodiment. Details are not described herein again.

409: The bypass check device sends a redirection indication to a client corresponding to the source IP address, where the redirection indication carries an address of the target verification server determined by the bypass check device.

410: The client sends a verification request to the target verification server based on the address of the target verification server.

The verification request carries a source IP address of the client. To enable the target verification server to subsequently redirect the client to a target server that the client requests to access, the verification request may further carry information such as a host name or an address of the target server that the client requests to access.

For the convenience of distinguishing from an access request sent by a client to a target server, in this embodiment, a request sent by a client to the target verification server is referred to as a verification request.

411: In response to the verification request, the target verification server returns a verification page to the client based on the source IP address.

412: The client obtains to-be-verified verification code information based on an input operation on the verification page.

The input operation on the verification page may be a verification code input operation, that the client obtains to-be-verified verification code information may be obtaining verification code information entered by a user. The entering may be understood as entering a verification code into a verification code input box or selecting a verification character, a verification picture, or the like on the verification page.

Certainly, the input operation on the verification page may alternatively be a specified action of a mouse operation. For example, the verification page prompts the user to perform a sliding operation in a specified manner, and then the input operation may be that the user performs a mouse operation based on the verification operation prompted by the verification page. In this case, the generated to-be-verified verification code information may be sliding track information of the mouse. For details, refer to the related description in the foregoing embodiment. Details are not described herein again.

413: The client sends the to-be-verified verification code information to the target verification server.

414: The target verification server verifies whether the verification code information returned by the client is correct verification code information.

For example, the target verification server may verify whether the verification code information returned by the client is a verification code that the target verification server instructs the client to enter or select. If the verification code information matches the verification code instructed by the target verification server, the client verification succeeds; if the verification code information does not match the verification code, the client verification fails.

For another example, the target verification server verifies whether an operation track represented by the verification code information is consistent with an operation track indicated by the target verification server. If the two operation tracks are consistent, it is determined that the client verification succeeds; if the two operation tracks are inconsistent, the client verification fails.

Certainly, there may further be another verification manner. This is not limited herein.

415: When confirming that the verification code information sent by the client is correct verification code information, the target verification server returns the source IP address corresponding to the client to the bypass check device.

416: The target verification server redirects the client to the target server.

The target verification server may determine, based on the verification request sent by the client, a target server that the client requests to access, and send, to the client, a redirection indication that instructs the client to access the target server. For example, a host name of the target server that the client requests to access is obtained from the verification request, and the redirection indication that carries the host name of the target server is sent, so that the client accesses the target server based on the host name of the target server.

A sequence of operation 415 and operation 416 is not limited to that shown in FIG. 4. In actual application, operation 415 and operation 416 may alternatively be performed simultaneously.

417: The bypass check device records the source IP address corresponding to the client into the verification success list.

418: The client sends again an access request to the target server to which the host name points, so that the bypass check device forwards the access request to the target server.

After the client sends the access request to the target server again, performing of operation 402 is triggered, so that the bypass check device intercepts the access request. The bypass check device may determine, based on the verification success list, that verification performed on the client by the target verification server has succeeded. Therefore, the bypass check device may directly forward the access request to the target server, without a need to redirect the client to the verification server.

It may be understood that, in this embodiment, to enhance security, at the same time when the bypass check device adds a source IP address of a client whose verification succeeds to the verification success list, effective duration for which the source IP address is recorded in the verification success list may be set. When the effective duration expires, the source IP address is deleted from the verification success list.

In this embodiment, descriptions are provided by using an example in which an access request for which defense is needed is identified by using a source IP address and a host name in the defense list. Therefore, before a domain name carried in the access request is obtained, the host name of the target server needs to be extracted from the domain name. It may be understood that, a case in which the access request for which defense is needed is identified by using other information in the defense list also applies to this embodiment, and an implementation process is similar to the implementation process in this embodiment. For example, when a page address may be recorded in the defense list, and in this way, after intercepting the access request, the bypass check device may parse out, from a domain name carried in the access request, a page address of a page that the access request requests to access, and then detect whether the page address is a page address recorded in the defense list. If the page address is a page address recorded in the defense list and a source IP address of the client is not recorded in the verification success list, the client that initiates the access request needs to be redirected to the target verification server, to perform verification code verification on the client.

It may be understood that, in the network attack defense system in this embodiment, a load manager may be further set. The load manager may obtain load of a plurality of optional verification servers in the network attack defense system. In this way, when the bypass check device needs to select, based on the load of the plurality of optional verification servers, from the plurality of optional verification servers, a target verification server that verifies the client, the bypass check device may query the load manager for load of a plurality of optional verification servers at a current moment.

Figure 5:
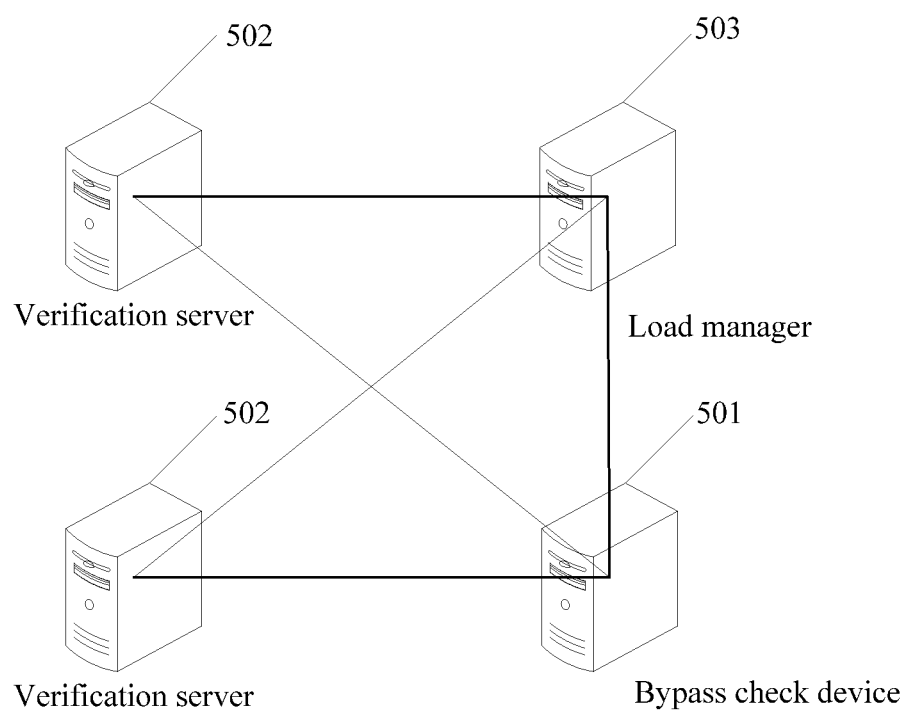
FIG. 5 is another schematic diagram of a network attack defense system according to an exemplary embodiment.

FIG. 5 is a schematic diagram of another configuration of a network attack defense system according to an exemplary embodiment. It can be learned from FIG. 5 that, in this embodiment, the network attack defense system further includes a load manager 503 in addition to a bypass check device 501 and at least one verification server 502 that is connected to the bypass check device by using a network.

A target verification server indicates the at least one verification server 502, and the load manager 503 is connected to the bypass check device 501 and the target verification server by using a network.

Figure 6:
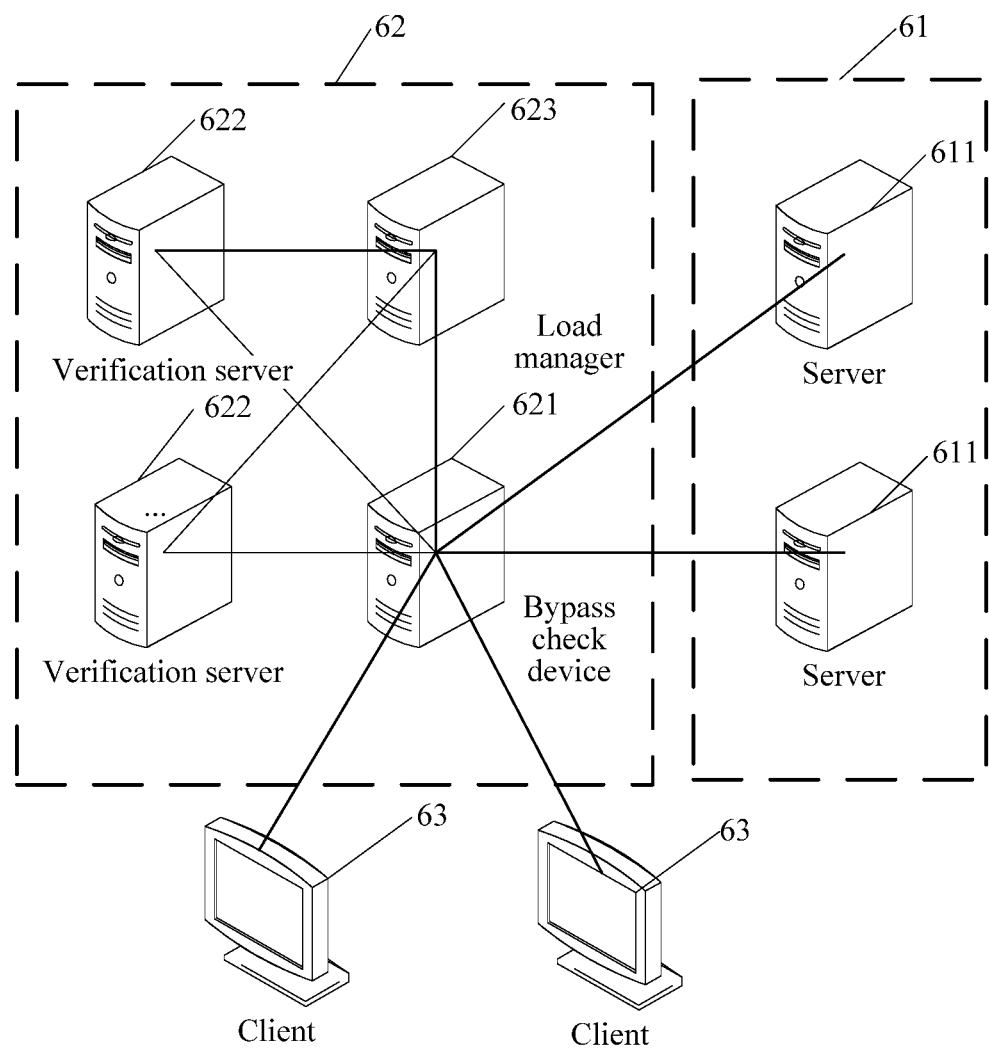
FIG. 6 is a schematic diagram of another application scenario of a network attack defense system according to an exemplary embodiment.

FIG. 6 is a schematic diagram of another application scenario of a network attack defense system according to an exemplary embodiment. It can be learned from FIG. 6 that, a service system 61 may include at least one server 611. With reference to FIGS. 5-6, the service system 61 is connected to a network attack defense system 62, and the network attack defense system 62 is deployed between a client 63 and the service system 61. The network attack defense system 62 includes a bypass check device 621, at least one verification server 622, and a load manager 623. In FIG. 6, an example in which there are two servers in the service system 61 is used, and a target server indicates the at least one server 611. Correspondingly, a target verification server indicates the at least one verification server 622.

Figure 7:
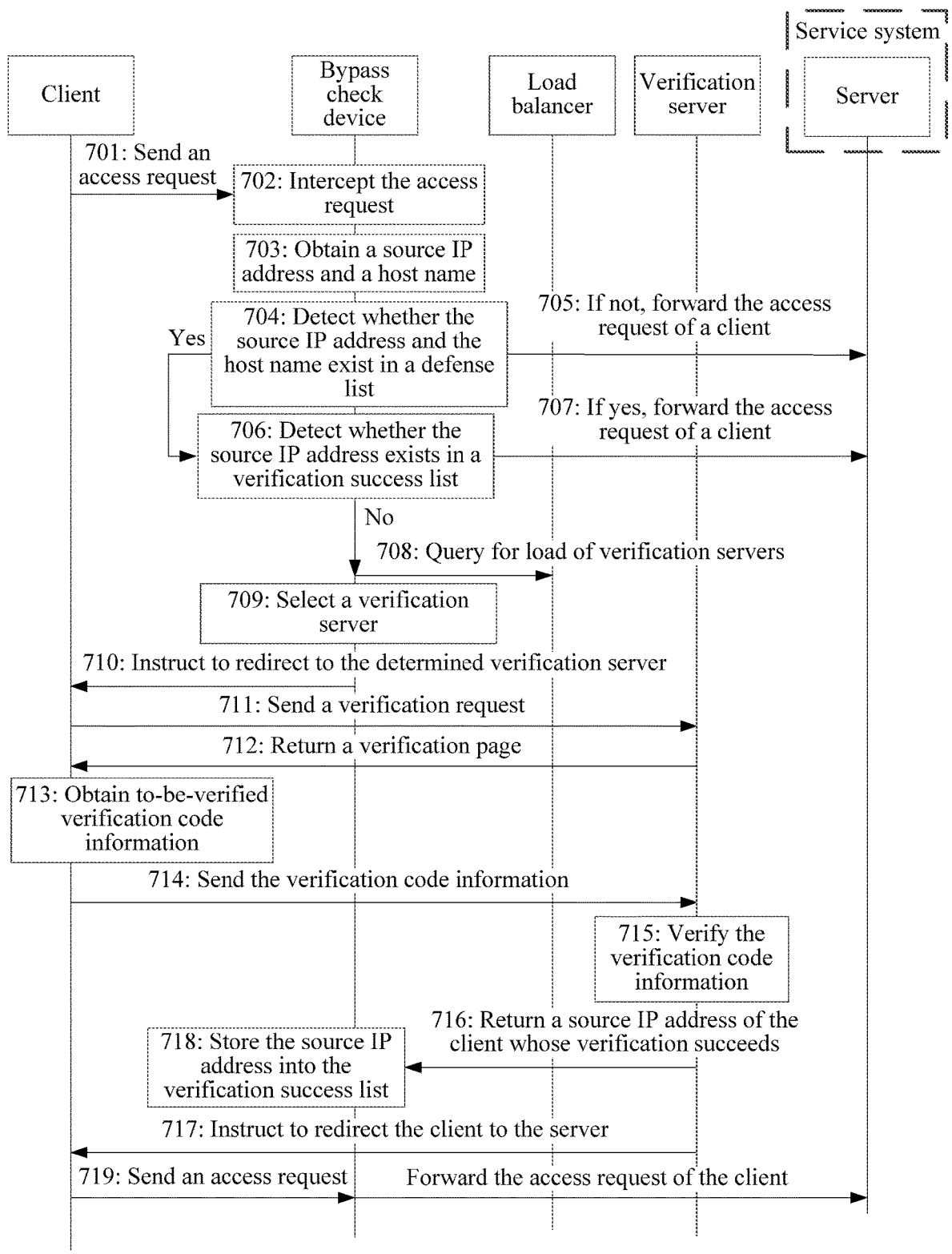
FIG. 7 is another schematic diagram of signaling interaction of a network attack defense method according to an exemplary embodiment.

FIG. 7 is another schematic diagram of signaling interaction of a network attack defense method according to an exemplary embodiment. With reference to FIGS. 5-7, in this embodiment, an example in which the network defense system has a plurality of verification servers is used. Each verification server may be used as an optional verification server, and descriptions are provided still by using the example in which a defense list includes a source IP address of a client that needs to be defended and a host name of a target server. The method in this embodiment may include the following operations:

701: The client sends an access request to the target server, where the access request carries a source IP address and a domain name.

The service system may include a plurality of servers. For example, the service system may be a cloud system, and a plurality of servers are deployed in the cloud system.

702: A bypass check device intercepts the access request.

703: The bypass check device obtains a source IP address and a domain name that are carried in the access request, and extracts a host name of the target server from the domain name.

704: The bypass check device detects whether the source IP address and the host name of the target server are recorded in a defense list.

705: If the source IP address and the host name of the target server are not recorded in the defense list, the bypass check device forwards the access request to the target server that the access request requests to access.

It may be understood that, if the defense list is not set in the bypass check device, all servers in the service system may be considered as servers that need to be defended. In this way, for any access request sent to the service system, a client that initiates the access request may be redirected to the target verification server. In this embodiment, setting the defense list to perform defense in a targeted manner is a preferable implementation.

706: If the source IP address and the host name of the target server are recorded in the defense list, the bypass check device detects whether the source IP address is recorded in a verification success list.

A source IP address corresponding to a client whose verification performed by the target verification server succeeds before a current moment is recorded in the verification success list.

707: If the source IP address is recorded in the verification success list, the bypass check device forwards the access request to the target server.

If the source IP address carried in the access request is recorded in the verification success list, it indicates that verification code verification performed on the client by the target verification server succeeds, thereby considering that the client is a reliable client, and then the access request sent by the client may be directly forwarded to the target server.

Operation 706 and operation 707 may be optional operations.

708: If the source IP address is not recorded in the verification success list, the bypass check device separately queries a load manager for load of a plurality of optional verification servers at a current moment.

709: The bypass check device selects, based on the load of the plurality of optional verification servers at the current moment, from the plurality of optional verification servers, a target verification server that is to verify the client.

For example, a target verification server that verifies the client may be selected based on a load balancing principle. For example, an optional verification server whose load value at a current moment is the minimum may be selected as a target verification server that verifies the client.

It may be understood that, operation 708 and operation 709 are only an implementation in which the target verification server that verifies the client is selected from the plurality of optional verification servers. In actual application, a preset association relationship between a target server and an optional verification server may also be preset in the bypass check device, for example, an association relationship between a host name of a target server and an optional verification server. In this way, after the bypass check device extracts the host name of the target server included in the domain name carried in the access request, if determining, from the plurality of optional verification servers, that there are a plurality of optional verification servers that have the association relationship with the host name of the target server, the bypass check device may further obtain current load of the plurality of optional verification servers associated with the host name of the target server, and then select, from the plurality of optional verification servers associated with the host name of the target server, the target verification server that is to verify the client.

710: The bypass check device sends a redirection indication to a client corresponding to the source IP address, where the redirection indication carries an address of the target verification server determined by the bypass check device.

711: The client sends a verification request to the target verification server based on the address of the target verification server.

The verification request may carry the source IP address corresponding to the client, and may further carry information such as an address or a host name of a target server that the client wants to access.

For the convenience of distinguishing from an access request sent by a client to a service system, in this embodiment, a request sent by a client to the target verification server is referred to as a verification request.

712: In response to the verification request, the target verification server returns a verification page to the client based on the source IP address of the client.

713: The client obtains to-be-verified verification code information based on an input operation on the verification page.

For the input operation on the verification page and a process of generating the to-be-verified verification code information, refer to the related descriptions in the foregoing embodiment. Details are not described herein again.

714: The client sends the to-be-verified verification code information to the target verification server.

715: The target verification server verifies whether the verification code information returned by the client is correct verification code information.

Operation 710 to operation 715 are only an implementation in which the bypass check device redirects the client to the target verification server to perform verification code verification. Another manner of redirecting the client to the target verification server, to perform verification code verification on the client also applies to this embodiment.

716: When confirming that the verification code information sent by the client is correct verification code information, the target verification server returns the source IP address corresponding to the client to the bypass check device.

717: The target verification server redirects the client to the target server.

For a specific implementation process of operation 717, refer to the related description in the foregoing embodiment. Details are not described herein again.

718: The bypass check device records the source IP address corresponding to the client into the verification success list.

Operation 718 may be an optional operation.

719: The client sends again an access request to the target server, so that the bypass check device forwards the access request to the target server.

After the client sends the access request again, the bypass check device may determine, based on the verification success list, that verification performed on the client by the target verification server succeeds. Therefore, the bypass check device may directly forward the access request to the target server, without a need to redirect the client to the target verification server.

Figure 8:
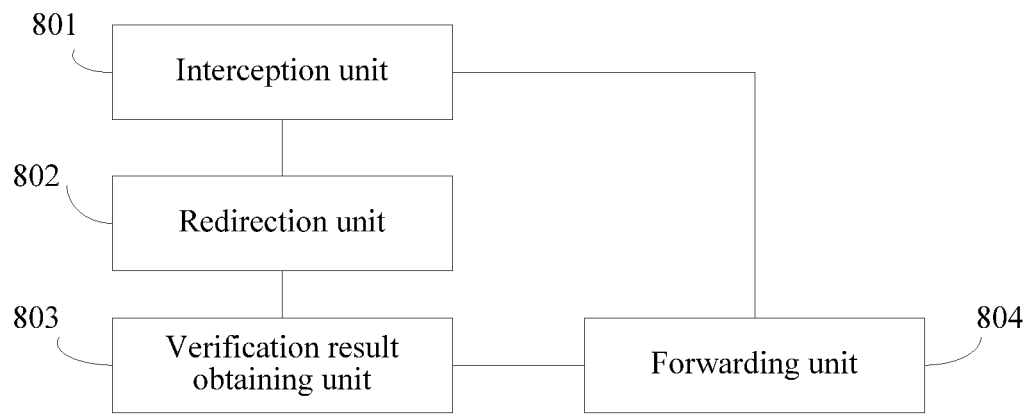
FIG. 8 is a schematic diagram of a network attack defense apparatus according to an exemplary embodiment.

FIG. 8 is a schematic diagram of a network attack defense apparatus according to an exemplary embodiment. The apparatus in this embodiment may be applied to a bypass check device, and the bypass check device is a device other than a verification server in a network attack defense system.

The apparatus in this embodiment may include:

an interception unit 801, configured to intercept an access request sent to a target server;

a redirection unit 802, configured to redirect, to a target verification server, a client that sends the access request, to perform verification code verification on the client by using the target verification server;

a verification result obtaining unit 803, configured to obtain a verification result of the verification code verification performed on the client by the target verification server; and a forwarding unit 804, configured to: when the verification result indicates that the client verification succeeds, forward, to the target server, the access request sent by the client.

The network attach defense apparatus (or the bypass check device) may include at least one processor that implements the interception unit 801, the redirection unit 802, the verification result obtaining unit 803, and the forwarding unit 804. For example, the at least one processor may include a central processing unit (CPU).

Optionally, the service system includes at least one server, and the target server is any server in the service system.

Optionally, the apparatus further includes:

a judgment unit, configured to: before the redirection unit redirects, to the target verification server, the client that sends the access request, determine, based on information carried in the access request, whether the verification code verification needs to be performed on the client that sends the access request; and when determining that the verification code verification needs to be performed on the client, perform the operation by the redirection unit.

Optionally, the judgment unit may include:

a first detection unit, configured to detect whether a source IP address carried in the access request is an IP address in a preset defense list; and when the source IP address is the IP address in the preset defense list, the verification code verification needs to be performed on the client that sends the access request.

Optionally, the judgment unit may include:

a domain name obtaining unit, configured to obtain a domain name carried in the access request;

an extraction unit, configured to extract a host name of the target server from the domain name; and a second detection unit, configured to: detect whether the host name of the target server is a host name in a preset defense list, where when the host name of the target server is the host name in the preset defense list, the verification code verification needs to be performed on the client that sends the access request.

Optionally, the apparatus may further include:

a determining unit, configured to: before the redirection unit redirects, to the target verification server, the client that sends the access request, determine, from a plurality of optional verification servers, the target verification server that is to verify the client.

Optionally, the determining unit includes:

a first determining subunit, configured to determine, based on current load of the plurality of optional verification servers, from the plurality of optional verification servers, the target verification server that is to verify the client.

Optionally, the apparatus further includes:

a load query unit, configured to query a load manager for the current load of the plurality of optional verification servers.

Optionally, the determining unit includes:

a second determining subunit, configured to determine, based on a preset association relationship between the target server and the target verification server, from the plurality of optional verification servers, the target verification server that has an association relationship with the target server that the access request requests to access.

Optionally, the apparatus further includes:

a third detection unit, configured to: before the redirection unit redirects, to the target verification server, the client that sends the access request, detect whether the source IP address carried in the access request is recorded in a verification success list, where an IP address of a client whose verification succeeds before a current moment is recorded in the verification success list; and when the source IP address carried in the access request is not recorded in the verification success list, perform the operation by the redirection unit, where the source IP address of the client is carried in the verification result obtained by the verification result obtaining unit; and The apparatus further includes:

a storage unit, configured to: when the verification result indicates that the client verification succeeds, store the source IP address of the client into the verification success list.

Figure 9:
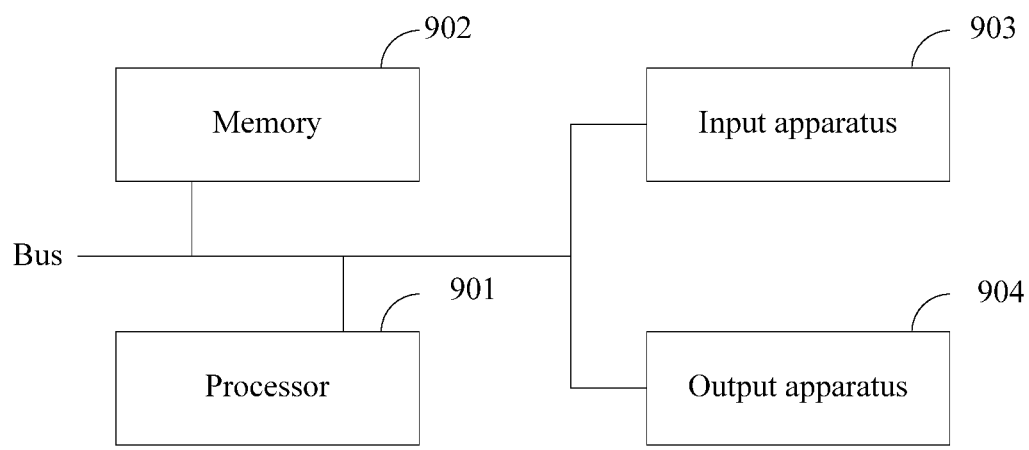
FIG. 9 is a possible schematic structural hardware diagram of a server according to an exemplary embodiment.

An exemplary embodiment further provides a server. Referring to FIG. 9, the server may include:

a processor 901, a memory 902, an input apparatus 903, and an output apparatus 904. In a browser server, there may be one or more processors 901. In FIG. 9, one processor is used as an example. In some embodiments, the processor 901, the memory 902, the input apparatus 903, and the output apparatus 904 may be connected by using a bus or in another manner, and the input apparatus 903 and the output apparatus 904 may be an interface of a communications module, such as an interface of a GSM module. In FIG. 9, a connection by using a bus is used as an example.

The memory 902 may be configured to store a software program and module. The processor 901 runs the software program and module stored in the memory 902, to implement various functional applications and data processing of the browser server. The memory 902 may include a program storage area and a data storage area, where the program storage area may store an operating system, an application program that is required by at least one function, and the like. In addition, the memory 902 may include a high speed random access memory, and may further include a non-volatile memory, such as at least one magnetic disk storage device, a flash memory, or other volatile solid-state storage devices. The input apparatus 903 may be configured to: receive input digit or character information, and generate a keyboard signal input related to the user setting and function control of the browser server.

Specifically, in this embodiment, the processor 901 may load, according to the following instructions, executable files corresponding to processes of one or more application programs into the memory 902. The processor 908 runs the application programs stored in the memory 902, to implement various functions:

intercepting an access request sent to a target server;

redirecting, to a target verification server, a client that sends the access request, to perform verification code verification on the client by using the target verification server;

obtaining a verification result of the verification code verification performed on the client by the target verification server; and when the verification result indicates that the client verification succeeds, forwarding, to the target server, the access request sent by the client.

Optionally, the service system includes at least one server, and the target server is any server in the service system.

Optionally, before the redirecting, to a target verification server, a client that sends the access request, the functions further include:

determining, based on information carried in the access request, whether the verification code verification needs to be performed on the client that sends the access request; and when determining that the verification code verification needs to be performed on the client, performing an operation of the redirecting, to a target verification server, a client that sends the access request.

Optionally, the determining, based on information carried in the access request, whether the verification code verification needs to be performed on the client that sends the access request includes:

detecting whether a source IP address carried in the access request is an IP address in a preset defense list; and when the source IP address is the IP address in the preset defense list, the verification code verification needs to be performed on the client that sends the access request.

Optionally, the determining, based on information carried in the access request, whether the verification code verification needs to be performed on the client that sends the access request includes:

obtaining a domain name carried in the access request, and extracting a host name of the target server from the domain name; and detecting whether the host name of the target server is a host name in a preset defense list, where when the host name of the target server is the host name in the preset defense list, the verification code verification needs to be performed on the client that sends the access request.

Optionally, before the redirecting, to a target verification server, a client that sends the access request, the functions further include:

determining, by the bypass check device, from a plurality of optional verification servers, the target verification server used for verifying the client.

Optionally, the determining, by the bypass check device, from a plurality of optional verification servers, the target verification server used for verifying the client includes:

determining, based on current load of the plurality of optional verification servers, from the plurality of optional verification servers, the target verification server used for verifying the client.

Optionally before the determining, based on current load of the plurality of optional verification servers, from the plurality of optional verification servers, the target verification server used for verifying the client, the functions further include:

querying a load manager for the current load of the plurality of optional verification servers.

Optionally, the determining, by the bypass check device, from a plurality of optional verification servers, the target verification server used for verifying the client includes:

determining, based on a preset association relationship between the target server and the target verification server, from the plurality of optional verification servers, the target verification server that has an association relationship with the target server.

Optionally, before the redirecting, to a target verification server, a client that sends the access request, the functions further include:

detecting whether the source IP address carried in the access request is recorded in a verification success list, where an IP address of a client whose verification succeeds before a current moment is recorded in the verification success list;

when the source IP address carried in the access request is not recorded in a verification success list, performing an operation of the redirecting, to a target verification server, a client that sends the access request, where the source IP address of the client is carried in the verification result.

The method further includes:

when the verification result indicates that the client verification succeeds, storing the source IP address of the client into the verification success list.

An exemplary embodiment further provides a storage medium, to store program code. The program code is used for executing any implementation in the network attack defense method in the foregoing embodiments.

An exemplary embodiment further provides a computer program product that includes an instruction, enabling a computer to perform any implementation in the network attack defense method in the foregoing embodiments when the computer program product is run on the computer.

It should be noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Persons skilled in the art may further realize that, in combination with the embodiments herein, units and algorithm, operations of each example described can be implemented with electronic hardware, computer software, or the combination thereof. In order to clearly describe the interchangeability between the hardware and the software, compositions and operations of each example have been generally described according to functions in the foregoing descriptions. The persons skilled in the art may further be aware that, in combination with the examples described in the embodiments disclosed in this specification, units and algorithm operations may be implemented by electronic hardware, computer software, or a combination thereof. To clearly describe the interchangeability between the hardware and the software, the foregoing has generally described compositions and operations of each example according to functions. Persons skilled in the art can use different methods to implement the described functions for each particular application, but it should not be considered that the implementation goes beyond the scope of the embodiments of the disclosure.

In combination with the embodiments herein, operations of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The "unit" or "module" used herein may be a hardware component such as a processor or a circuit, and/or a software component that is executed by a hardware component such as a processor.

The above description of the disclosed embodiments enables persons skilled in the art to implement or use the disclosure. Various modifications to these embodiments are obvious to persons skilled in the art, and the general principles defined in the disclosure may be implemented in other embodiments without departing from the spirit and scope of the disclosure. Therefore, the disclosure is not limited to these embodiments, but needs to conform to the broadest scope consistent with the principles and novel features disclosed in the disclosure.

What is claimed is:

1. A network attack defense method, comprising:
   intercepting, by at least one processor of a bypass check device, an access request transmitted from a client to a target server;
   obtaining, by the at least one processor of the bypass check device, a domain name included in the access request, and extracting a host name of the target server from the domain name;
   detecting, by the at least one processor of the bypass check device, that the host name of the target server corresponds to a host name in a preset defense list;
   based on a result of the detecting, determining to perform a verification of a verification code on the client;
   redirecting, by the at least one processor of the bypass check device, the client to a target verification server, to perform the verification of the verification code on the client;
   obtaining, by the at least one processor of the bypass check device, a verification result of the verification of the verification code performed on the client by the target verification server; and
   forwarding, by the at least one processor of the bypass check device, to the target server, the access request sent by the client based on the verification result indicating that client verification is successful.

2. The network attack defense method according to claim 1, wherein the target server is included in a service system, the service system comprising one or more servers.

3. The network attack defense method according to claim 1, further comprising:
   detecting, by the at least one processor of the bypass check device, whether a source IP address included in the access request corresponds to an IP address in the preset defense list; and
   based on a result of the detecting, determining to perform the verification of the verification code on the client.

4. The network attack defense method according to claim 1, further comprising:
   determining, by the at least one processor of the bypass check device, the target verification server from a plurality of verification servers.

5. The network attack defense method according to claim 4, wherein the determining the target verification server comprises:
   determining, by the at least one processor of the bypass check device, the target verification server based on current load of the plurality of verification servers.

6. The network attack defense method according to claim 5, further comprising:
   querying, by the at least one processor of the bypass check device, a load manager about the current load of the plurality of verification servers.

7. The network attack defense method according to claim 4, wherein the determining the target verification server comprises:
   determining, by the at least one processor of the bypass check device, the target verification server based on a preset association relationship between the target server and the target verification server, from the plurality of verification servers.

8. The network attack defense method according to claim 1, further comprising:
   detecting, by the at least one processor of the bypass check device, whether a source IP address included in the access request is recorded in a verification success list, the verification success list comprising at least one IP address of at least one client whose verification was successful prior to a current time;
   when the source IP address included in the access request is not recorded in the verification success list, redirecting the client to the target verification server;

storing, by the at least one processor of the bypass check device, the source IP address of the client into the verification success list based on the verification result indicating that the client verification is successful, the source IP address of the client being included in the verification result.

9. A network attack defense apparatus, comprising:
at least one memory configured to store program code; and
at least one processor configured to access the at least one memory and operate according to the program code, the program code comprising:
  interception code configured to cause the at least one processor to intercept an access request transmitted from a client to a target server;
  judgment code configured to cause the at least one processor to obtain a domain name included in the access request, extract a host name of the target server from the domain name, detect whether the host name of the target server corresponds to a host name in a preset defense list, and determine to perform verification of a verification code on the client based on a result of detecting;
  redirection code configured to cause the at least one processor to redirect the client to a target verification server, to perform the verification of the verification code on the client;
  verification result obtaining code configured to cause the at least one processor to obtain a verification result of the verification of the verification code performed on the client by the target verification server; and
  forwarding code configured to cause the at least one processor to forward, to the target server, the access request transmitted by the client based on the verification result indicating that client verification is successful.

10. The network attack defense apparatus according to claim 9, wherein the target server is included in a service system, the service system comprising one or more servers.

11. The network attack defense apparatus according to claim 9, wherein the judgment code further causes the at least one processor to detect whether a source IP address included in the access request corresponds to an IP address in the preset defense list, and determine to perform the verification of the verification code on the client based on a result of detection.

12. The network attack defense apparatus according to claim 9, wherein the program code further comprises:
  determining code configured to cause the at least one processor to determine the target verification server from a plurality of verification servers.

13. The network attack defense apparatus according to claim 9, wherein the program code further comprises:
  third detection code configured to cause the at least one processor to detect whether a source IP address included in the access request is recorded in a verification success list, the verification success list comprising at least one IP address of at least one client whose verification was successful prior to a current time, and to redirect the client to the target verification server when the source IP address included in the access request is not recorded in the verification success list; and
  storage code configured to cause the at least one processor to store the source IP address of the client into the verification success list based on the verification result indicating that the client verification is successful, the source IP address of the client being included in the verification result.

14. A network attack defense system, comprising:
a bypass check device comprising at least one processor; and
a target verification server,
the bypass check device being configured to: intercept an access request transmitted from a client to a target server; obtaining, by the at least one processor of the bypass check device, a domain name included in the access request, and extracting a host name of the target server from the domain name; detecting, by the at least one processor of the bypass check device, that the host name of the target server corresponds to a host name in a preset defense list; based on a result of the detecting, determining to perform a verification of a verification code on the client; redirect the client to the target verification server, to perform the verification of the verification code on the client; obtain a verification result of the verification of the verification code performed on the client by the target verification server; and forward, to the target server, the access request transmitted by the client based on the verification result indicating that client verification is successful; and
the target verification server being configured to: perform the verification of the verification code on the client, and return the verification result to the bypass check device.

15. A network attack defense device, comprising:
at least one processor; and
at least one memory configured to store program code,
wherein the at least one processor of the network attack defense device performs, by executing the program code, the network attack defense method according to claim 1 comprising:
  intercepting, by at least one processor of a bypass check device, an access request transmitted from a client to a target server;
  obtaining, by the at least one processor of the bypass check device, a domain name included in the access request, and extracting a host name of the target server from the domain name;
  detecting, by the at least one processor of the bypass check device, that the host name of the target server corresponds to a host name in a preset defense list;
  based on a result of the detecting, determining to perform a verification of a verification code on the client;
  redirecting, by the at least one processor of the bypass check device, the client to a target verification server, to perform the verification of the verification code on the client;
  obtaining, by the at least one processor of the bypass check device, a verification result of the verification of the verification code performed on the client by the target verification server; and
  forwarding, by the at least one processor of the bypass check device, to the target server, the access request sent by the client based on the verification result indicating that client verification is successful.

16. A non-transitory storage medium, the non-transitory storage medium storing program code, wherein at least one processor executes the program code to perform the network attack defense method according to claim 1, comprising:
  intercepting, by at least one processor of a bypass check device, an access request transmitted from a client to a target server;

obtaining, by the at least one processor of the bypass check device, a domain name included in the access request, and extracting a host name of the target server from the domain name;

detecting, by the at least one processor of the bypass check device, that the host name of the target server corresponds to a host name in a preset defense list;

based on a result of the detecting, determining to perform a verification of a verification code on the client;

redirecting, by the at least one processor of the bypass check device, the client to a target verification server, to perform the verification of the verification code on the client;

obtaining, by the at least one processor of the bypass check device, a verification result of the verification of the verification code performed on the client by the target verification server; and forwarding, by the at least one processor of the bypass check device, to the target server, the access request sent by the client based on the verification result indicating that client verification is successful.

* * * * *